L. A. MAYALL.
Vehicle-Axle.

No. 211,764. Patented Jan. 28. 1879.

Witnesses
Henry Howson Jr.
Harry Smith

Inventor
Louis A. Mayall
by his Attorneys
Howson and Son

UNITED STATES PATENT OFFICE.

LOUIS A. MAYALL, OF PHILADELPHIA, PENNSYLVANIA, ASSIGNOR OF ONE-HALF HIS RIGHT TO GOTTLIEB FINKBEINER, OF SAME PLACE.

IMPROVEMENT IN VEHICLE-AXLES.

Specification forming part of Letters Patent No. 211,764, dated January 28, 1879; application filed December 16, 1878.

*To all whom it may concern:*

Be it known that I, LOUIS A. MAYALL, of Philadelphia, Pennsylvania, have invented a new and useful Improvement in Carriage-Axle Boxes, of which the following is a specification:

The object of my invention is to combine the box of a carriage-wheel and a grooved axle-journal with retaining and releasing devices, substantially as described hereinafter, so that the wheel can be readily withdrawn from and as readily connected to the said axle.

Figure 1:
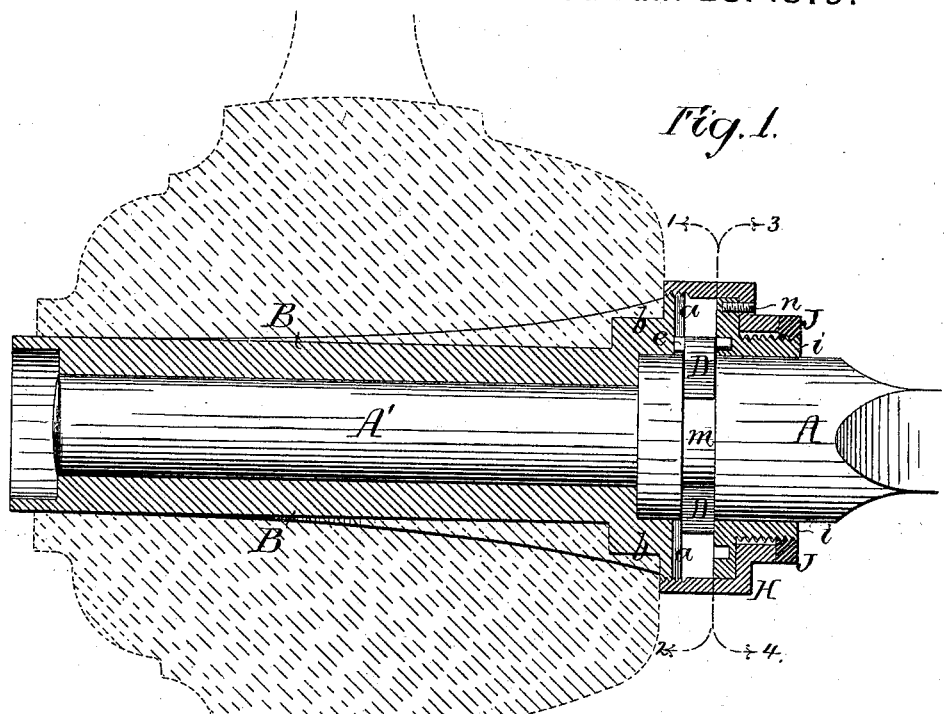
Figure 2:
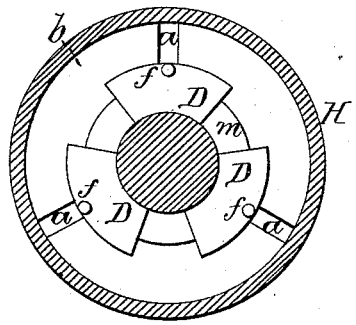
Figure 3:
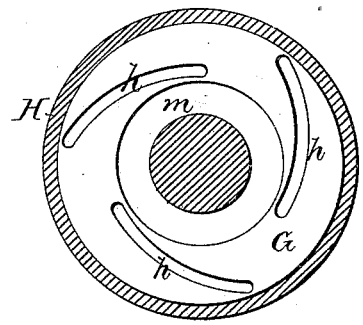

In the accompanying drawings, Figure 1 is a longitudinal section of a box for carriage-wheels, with devices for connecting the wheel to and freeing it from the axle; Fig. 2, a transverse section on the line 1 2, Fig. 1; and Fig. 3, a transverse section on the line 3 4, Fig. 1.

A represents a portion of the axle of a carriage or other vehicle, and A' the journal, adapted to the journal-box B, which may be fitted and secured to the hub of the wheel in the usual manner.

A hub or enlargement, $b$, is formed on the box, and in the face of this hub are cut radial guiding-slots $a$—three in the present instance. Into each slot fits a projection, $e$, on one side of a slide, D, on the opposite side of which is another projection, $f$, adapted to one of the cam-slots $h$ in a plate, G.

The slides are adapted to a groove, $m$, in the axle, and are, with the plate G, confined to their places by a cap, H, which is screwed or otherwise secured to the enlargement $b$ of the box B.

A set-screw, $n$, passes through the cap H and into the plate G, so that the latter cannot be turned without the said cap.

The plate G has a collar, $i$, to which is adapted a nut, J, the latter, when it is screwed up, bearing against a central enlargement of the cover-plate H, so as to act as a jam-nut.

As shown in the drawing, the slides project into the groove $m$ of the axle, thereby retaining the box and wheel on the same. The wheel, however, is at liberty to turn on the axle, and cannot be withdrawn therefrom as long as the parts bear the relation to each other shown in Figs. 1 and 2.

When the wheel has to be detached from the axle, all that is necessary is to first loosen the nut J, and then turn the cap H, and with it the plate G, until the cam-slots withdraw the slides from the groove $m$ of the axle, when the box will be at liberty and the wheel can be withdrawn.

As long as the screw $n$ remains in its place the turning of the cap H on the hub will be limited by the movement of the slides; but on removing the screw the cap may be entirely detached from the hub of the box, and the operating parts may then be removed for cleansing or repairs.

I claim as my invention—

1. The combination of the grooved axle A, the box B and its slides D, the cap H, and the plate G, having cam-slots adapted to projections on the slides, all substantially as specified.

2. The combination of the grooved axle A, the box B, the slides D, the plate G, the cap H, and the nut J, all as set forth.

In testimony whereof I have signed my name to this specification in the presence of two subscribing witnesses.

LOUIS A. MAYALL.

Witnesses:
 ALEX. PATTERSON,
 HARRY SMITH.